United States Patent [19]

Nakagawa

[11] Patent Number: 5,639,960
[45] Date of Patent: Jun. 17, 1997

[54] MISFIRE DETECTING METHOD AND APPARATUS FOR AN INTERNAL COMBUSTION ENGINE

[75] Inventor: Akihiro Nakagawa, Tokyo, Japan

[73] Assignee: Mitsubishi Denki Kabushiki Kaisha, Tokyo, Japan

[21] Appl. No.: 731,822

[22] Filed: Oct. 21, 1996

[30] Foreign Application Priority Data

Apr. 25, 1996 [JP] Japan .................... 8-105617

[51] Int. Cl.$^6$ .................... F02D 1/00; G01M 15/00
[52] U.S. Cl. .................... 73/116; 73/117.3; 123/419; 123/436; 364/431.07; 364/431.08
[58] Field of Search .................... 73/116, 117.2, 73/117.3; 123/419, 425, 436; 364/431.07, 431.08

[56] References Cited

U.S. PATENT DOCUMENTS

| | | | |
|---|---|---|---|
| 5,222,392 | 6/1993 | Baba et al. .................... | 73/116 |
| 5,263,453 | 11/1993 | Wakahara et al. .................... | 73/117.3 |
| 5,311,773 | 5/1994 | Bradshaw et al. .................... | 123/419 |
| 5,357,788 | 10/1994 | Kantschar et al. .................... | 73/117.3 |
| 5,357,790 | 10/1994 | Hosoya .................... | 364/431.08 |

FOREIGN PATENT DOCUMENTS

4-194346  7/1992  Japan .

*Primary Examiner*—George M. Dombroske
*Attorney, Agent, or Firm*—Sughrue, Mion, Zinn, Macpeak & Seas

[57] ABSTRACT

A misfire detecting apparatus for an internal combustion engine in which erroneous decision as to occurrence of misfire is prevented regardless of engine rotation speed variation pattern. The apparatus includes a crank angle sensor (4) mounted on a crank shaft (2) of the internal combustion engine (1) for generating a crank angle signal (θ) for every predetermined crank angle of the engine (1), a rotation-speed variation detector (21, 22) for detecting variation in rotation of the internal combustion engine (1) on the basis of the crank angle signal (θ), a misfire decision means (23A) for determining occurrence of misfire on the basis of the variation in the rotation speed of the engine (1), a rotation-speed variation pattern decision means (41) for deciding whether or not a rotation-speed variation pattern representing the variation of the rotation speed of the engine matches with a predetermined pattern which indicates resonance with a driving system operatively coupled to the internal combustion engine, and a misfire decision inhibit means (42) for invalidating the misfire decision means (23A) when matching is found between the rotation-speed variation pattern and the predetermined pattern.

16 Claims, 8 Drawing Sheets

MISFIRE DETECTING METHOD AND APPARATUS FOR AN INTERNAL COMBUSTION ENGINE

BACKGROUND OF THE INVENTION

1. Field of the Invention

The present invention relates generally to a misfire detecting method for deciding or detecting occurrence of misfire on the basis of variation in rotation speed (rpm) of an internal combustion engine and an apparatus for carrying out the method. More specifically, the invention is concerned with misfire detecting method and apparatus which are so arranged that erroneous misfire decision due to variation in the rotation speed of the engine as brought about by resonance phenomenon taking place in a driving system can be excluded.

2. Description of Related Art

Heretofore, the misfire detecting apparatus which is so arranged as to make decision concerning occurrence of misfire on the basis of variation in the rotation number or speed (rpm) of the internal combustion engine is well known in the art, as is disclosed, for example, in Japanese Unexamined Patent Application Publication No. 194346/1992 (JP-A-4-194346). More specifically, in the conventional misfire detecting apparatus known heretofore, a pulse period is measured or determined for every unit crank angle on the basis of a crank angle signal, whereon a mean angular velocity for every unit crank angle is differentiated three times to thereby determine a value which is used as an index indicating variation (also referred to as the variation index) of the pulse period and hence that of rotation speed of the internal combustion engine. Decision as to occurrence of misfire is realized by comparing the variation index as determined with a predetermined decision reference value.

Figure 6:
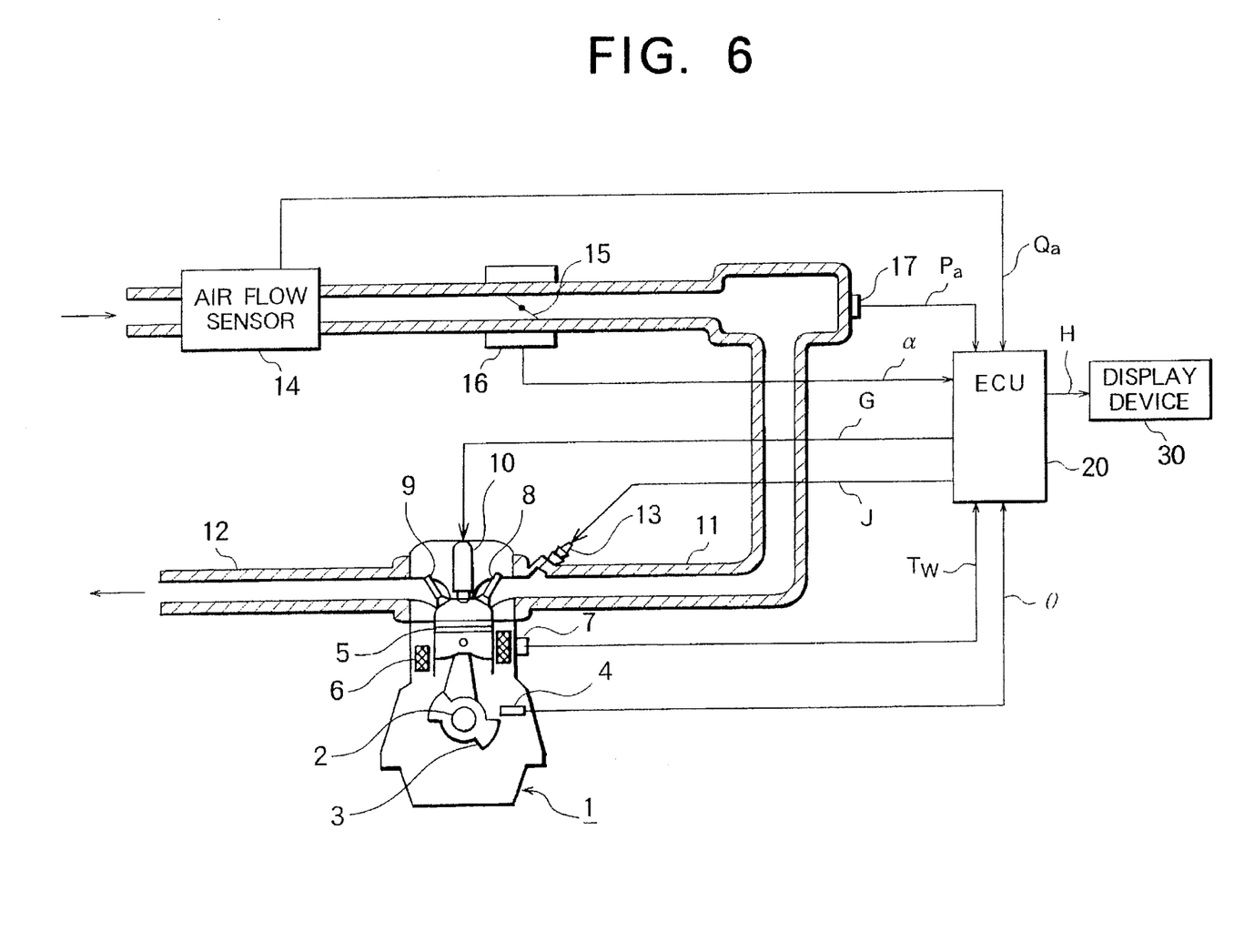
FIG. 6 is a schematic diagram showing generally a conventional engine control apparatus which incorporates a misfire detecting function.

For having better understanding of the present invention, the background techniques thereof will be described in some detail. FIG. 6 is a schematic diagram showing the conventional apparatus having a misfire detecting function as disclosed in the above publication.

Referring to the figure, mounted on a crank shaft 2 which is rotationally driven by an internal combustion engine (hereinafter referred to simply as the engine) 1 is a sensing blade member 3 having segment-like blades disposed fixedly the rotational direction so as to rotate together with the crank shaft 2.

On the other hand, a crank angle sensor 4 is stationarily mounted on the engine body 1, facing in opposition to the segment blade member 3, for detecting edges of the segment-like blades to thereby output a crank angle signal θ containing a sequence of pulses each generated for each unit crank angle.

Each of the engine cylinders 5 which defines combustion chambers of the engine 1 is surrounded by a space through which cooling water 6 is forced to flow. For detecting the temperature Tw of the cooling water 6, there is provided a water temperature sensor 7. Further, each of the engine cylinders 5 is provided with an intake valve 8, an exhaust valve 9 and an ignition plug 10 which are driven at predetermined cycles or timings, respectively.

Although only one engine cylinder 5 is shown in FIG. 6, this is only for simplification of illustration. It goes without saying that a plurality of cylinders (e.g. four or six cylinders) may be incorporated in the engine in juxtaposition to one another. Further, the crank angle signal θ is commonly referred to as the reference position signal SGT, wherein the falling edge of each pulse contained in the crank angle signal θ corresponds to the reference position for each of the individual engine cylinders.

The intake valve 8 and the exhaust valve 9 are opened and closed in accordance with a control procedure of the engine 1 in such a manner that the engine cylinder 5 is communicated through the intake valve 8 to an intake pipe 11 during an intake (or suction) stroke, while it is communicated through the exhaust valve 9 to an exhaust pipe 12 during an exhaust stroke. On the other hand, the ignition plug 10 is applied with a high voltage for generating a spark at a proper time point in a combustion/expansion stroke which succeeds to a compression stroke, whereby air-fuel mixture gas charged in the engine cylinder 5 is ignited.

Provided in association with the intake pipe 11 are a fuel injector 13 for injecting fuel upstream of the intake valve 8 to thereby produce an air-fuel mixture, an air flow sensor 14 for detecting an intake air flow Qa at an air intake port, a throttle valve 15 disposed at a position downstream of the air flow sensor 14 and driven to be opened or closed, a throttle position sensor 16 for detecting an opening degree α of the throttle valve 15 and a pressure sensor 17 for detecting the intake pipe pressure Pa prevailing within the intake pipe 11.

The detection information signals θ, Tw, Qa, α and Pa outputted from the above-mentioned sensors 4, 7, 14, 16 and 17, respectively, are inputted to an electronic control unit (ECU for short) 20 which may be constituted by a microcomputer.

Of the detection information signals mentioned above, at least one of the intake air flow Qa outputted from the air flow sensor 14, the throttle opening degree α derived from the output of the throttle position sensor 16 and the intake pipe pressure Pa detected by the pressure sensor 17 is made use of as load information which indicates a load state of the engine 1.

The ECU 20 serving as the conventional engine control apparatus incorporating the misfire detecting function is comprised of an input/output interface, an analogue-to-digital or A/D converter, a time counter, a read-only memory or ROM, a random access memory or RAM and so forth (not shown) for arithmetically determining control parameters on the basis of the various engines operations state indicating signals θ, Tw, Qa, α and Pa as detected, to thereby generate an ignition signal G for the ignition plug 10 and a fuel injection signal J for the injector 13.

The ECU 20 is so arranged as to make decision concerning occurrence of misfire on the basis of the crank angle signal θ to thereby output a misfire decision signal H when occurrence of misfire event is detected. In that case, a display device 30 is activated to generate a message of occurrence of misfire to the operator.

Figure 7:
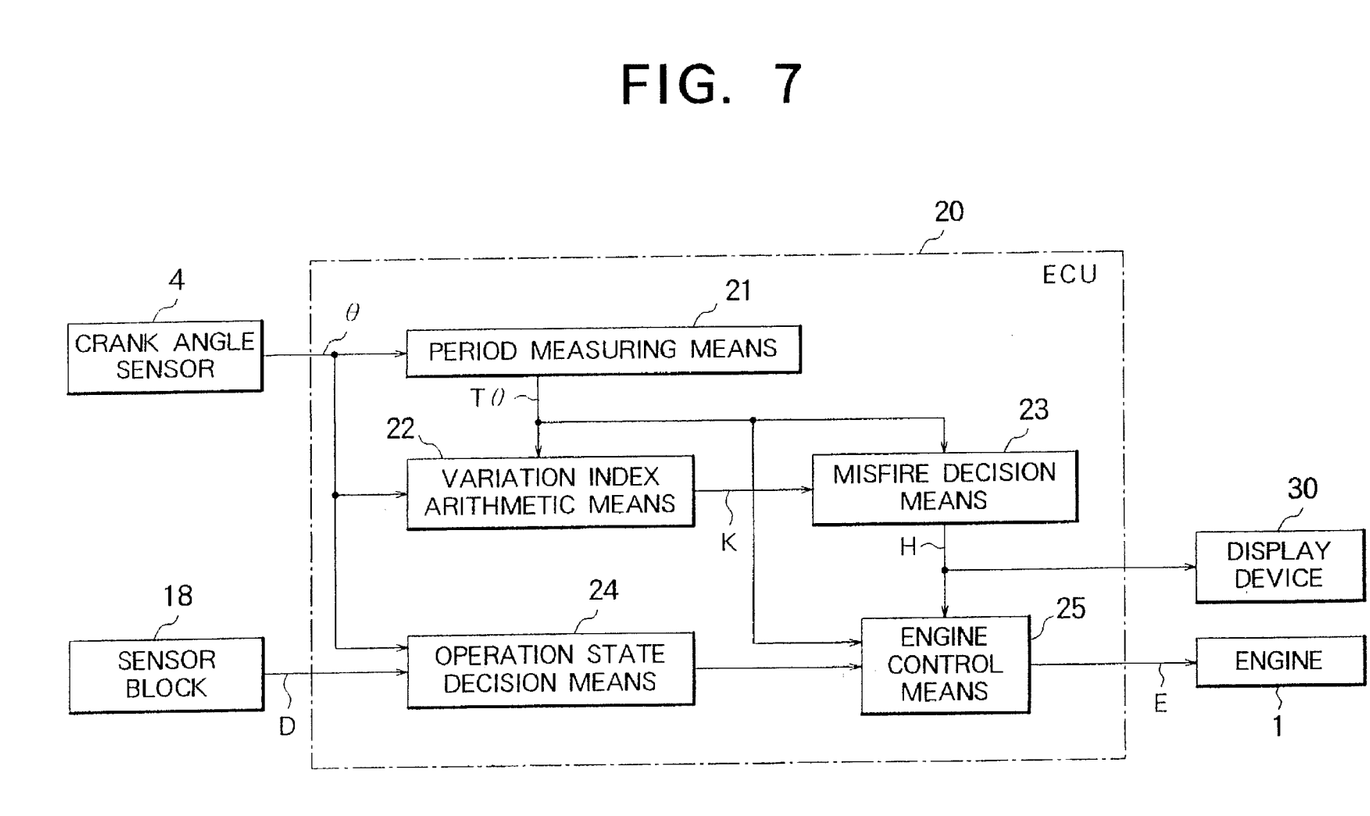
FIG. 7 is a block diagram for illustrating function modules a conventional misfire detecting apparatus known heretofore.

FIG. 7 is a block diagram for illustrating functions of a conventional misfire detecting apparatus known heretofore which is incorporated in the ECU 20 shown in FIG. 6.

Referring to FIG. 7, a sensor block 18 represents correctively the crank angle sensor 4, the water temperature sensor 7, the air flow sensor 14, the throttle position sensor 16 and the pressure sensor 17, and thus operation information D outputted from the sensor block 18 includes the crank angle signal θ, the temperature Tw, the intake air flow Qa, the throttle opening degree α, and the intake pipe pressure Pa mentioned above, while an engine control signal E outputted from the ECU 20 contains the ignition signal G and the fuel injection signal J mentioned previously.

The ECU 20 in turn is composed of a period measuring means 21 for measuring or determining a pulse period or duration Tθ contained in the crank angle signal θ for every unit crank angle, a variation index arithmetic means 22 for arithmetically determining the variation index (mentioned hereinbefore and designated by K) indicating variation of the pulse period Tθ and hence variation in the rotation number or speed (rpm) of the engine 1 and a misfire decision means 23 for making decision concerning occurrence of misfire on the basis of the variation index K to thereby output a misfire decision signal H upon decision of occurrence of the misfire event.

The crank angle signal θ represents the rotation number or speed (rpm) of the engine 1. Thus, the period measuring means 21 constituting a part of the ECU 20 also serves as an engine rotation speed (rpm) detecting means.

On the other hand, the period measuring means 21 and the variation index arithmetic means 22 cooperate to constitute a rotation speed variation detecting means for detecting variation in the rotation speed (rpm) of the engine 1, while the misfire decision means 23 cooperate with the period measuring means 21 and the variation index arithmetic means 22 to constitute a major part of the misfire detecting apparatus.

Furthermore, the ECU 20 includes an operation state decision means 24 for determining or deciding the operation state of the engine 1 on the basis of the crank angle signal θ and the operation information D, and an engine control means 25 for generating an engine control signal E on the basis of the operation state of the engine as detected and the misfire decision signal H.

Figure 8:
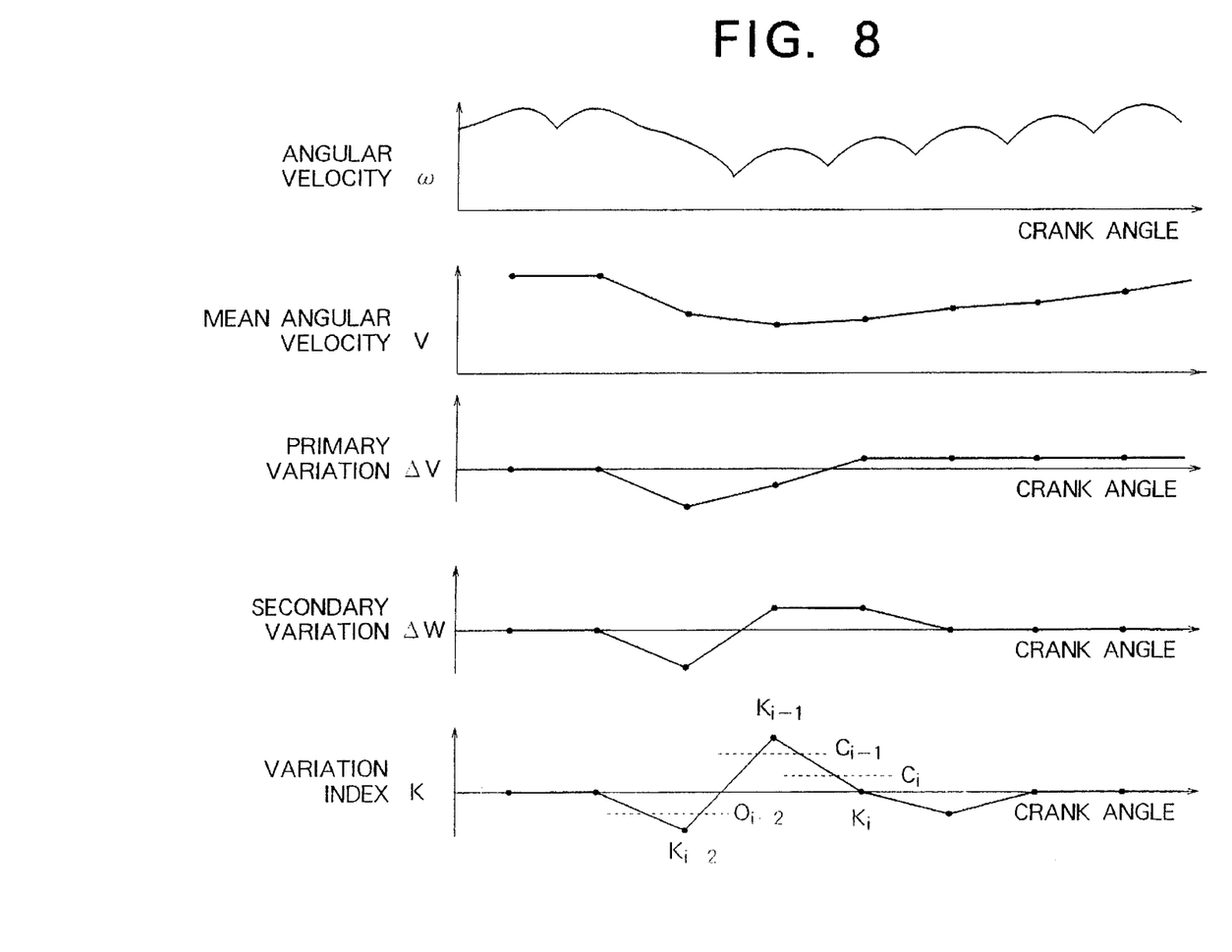
FIG. 8 is a waveform diagram for illustrating an operation of the conventional misfire decision apparatus.

Next, referring to a waveform diagram shown in FIG. 8, description will be directed to operation of the conventional misfire detecting apparatus shown in FIGS. 6 and 7.

In FIG. 8, an angular velocity ω is equivalent to the rotation speed (rpm) of the engine 1 and a tertiary variation of a mean angular velocity V (i.e., a value obtained by differentiating three times the mean angular velocity V) is equivalent to the variation index K of the pulse period or duration Tθ.

Parenthetically, although the value obtained by differentiating the mean angular velocity V three times (hereinafter referred to as the tertiary variation) is used as the variation index K for the misfire decision, a primary variation ΔV of the mean angular velocity V (i.e., mean angular acceleration obtained by differentiating once the mean angular velocity) or a secondary variation ΔW (i.e., value obtained by differentiating twice the mean angular velocity V) may be used as the variation index K.

Furthermore, in the case of the example illustrated in FIG. 8, it is assumed that the variation index K is compared with decision values Ck (where k=i–2, i–1 and i, respectively) which corresponds to a pre-preceding index value $K_{i-2}$, a preceding index value $K_{i-1}$ and a current index value $K_i$, respectively.

In the normal operation state of the internal combustion engine, the engine control means 25 incorporated in the ECU 20 generates the ignition signal G and the fuel injection signal J conforming to the engine operation state determined on the basis of the crank angle signal θ and the operation information D for thereby controlling the operation of the engine 1.

On the other hand, the period measuring means 21 measures or determines the pulse period or duration Tθ between the successive falling edges of the pulses contained in the crank angle signal θ, while the variation index arithmetic means 22 arithmetically determines the angular velocity ω on the basis of the pulse period or duration Tθ (see FIG. 8).

In addition, the variation index arithmetic means 22 determines the mean angular velocity V for the angular velocity ω and then determines on the basis of the mean angular velocity V a difference ($V_i - V_{i-1}$) between the preceding value $V_{i-1}$ and the current value $V_i$ of the mean angular velocity V as the primary variation ΔV, a difference ($\Delta V_i - \Delta V_{i-1}$) between the preceding value $\Delta V_{i-1}$ of the primary variation ΔV and the current value $\Delta V_i$ as the secondary variation ΔW, while determining a difference ($\Delta W_i - \Delta W_{i-1}$) between the preceding value $\Delta W_{i-1}$ of the secondary variation ΔW and the current value $\Delta W_i$ as the tertiary variation, i.e., the variation index K.

The misfire decision means 23 compares the pre-preceding value $K_{i-2}$, the preceding value $K_{i-1}$ and the current value $K_i$ of the variation index K with the pre-preceding decision reference value $C_{i-2}$, the preceding decision reference value $C_{i-1}$ and the current decision reference value $C_i$, respectively, wherein when the conditions mentioned below are concurrently satisfied, the misfire decision means 23 decides that the misfire event occurs at a higher probability than a predetermined value, to thereby issue a misfire decision signal H.

$$K_{i-2} < C_{i-2}$$
$$K_{i-1} > C_{i-1}$$
$$K_i > C_i$$

In FIG. 8, there is illustrated such situation in which the state meeting the misfire conditions mentioned above takes place only once between the normal combustion strokes.

Under the circumstances, the misfire decision signal H is generated. The engine control means 25 then responds to the misfire decision signal H to thereby disable or inhibit application or supply of the fuel injection signal J to the fuel injector 18 of the engine cylinders 5 for which decision is made that the misfire occurred, to thereby prevent exhaust of the gas mixture undergone insufficient combustion.

On the other hand, the display device 30 is driven in response to the misfire decision signal H to massage occurrence of the misfire event to the operator.

In this conjunction, it is however noted that in certain operation states such as low-speed or low-load operation state, single-shot misfire which can or should be neglected is likely to occur. Besides, resonance with the driving system such as transmission which is operatively coupled to the crank shaft of the engine may often take place due to external disturbances or the like. Such being the circumstances, the variation index K may meet the misfire determination conditions mentioned previously, notwithstanding of the fact that the combustion stroke of the engine is normal.

For the reasons mentioned above, misfire decision may erroneously be made even in the normal operation state of the engine, whereby the fuel injection is unnecessarily cut off with the misfire indication being generated, in operation states such as low-speed operation state of the engine, low-load operation state thereof or the like, giving rise to problem.

As will now be apparent from the above description, the conventional misfire detecting apparatus suffers such problem that misfire decision may erroneously be made in the low-speed or low-load operation state of the engine, because decision as to occurrence of the misfire is made only on the basis of the variation index K.

SUMMARY OF THE INVENTION

In the light of the state of the art described above, it is an object of the present invention to provide a misfire detecting method for an internal combustion engine, which method is capable of excluding erroneous decision concerning occurrence of misfire by inhibiting misfire decision when variation in rotation speed of an internal combustion engine matches with a rotation-speed variation pattern indicating such engine operation state in which resonance may occur in a driving system operatively coupled to the engine for driving a load or loads.

Another object of the invention is to provide a misfire detecting apparatus for carrying out the method mentioned above.

In view of the above and other objects which will become apparent as the description proceeds, there is provided according to a general aspect of the present invention a method of detecting occurrence of misfire in an internal combustion engine to which a driving system for driving a load is operatively connected, which method includes the steps of generating a crank angle signal for every predetermined crank angle of the engine, detecting variation in rotation speed of the internal combustion engine on the basis of information given by the crank angle signal, determining occurrence of misfire on the basis of the variation in the rotation speed of the engine, deciding whether or not the internal combustion engine is in resonance operation state in which resonance with the driving system can occur, and invalidating the misfire occurrence determining step when decision that the engine is in the resonance operation state is made in the resonance state decision step.

In a preferred mode for carrying out the a misfire detecting method described above, the resonance state decision step may include the substep of deciding whether or not a rotation-speed variation pattern of the variation of the rotation speed of the engine matches at least reasonably with a predetermined pattern which indicates resonance with the driving system, wherein the misfire occurrence determining step is invalidated when matching is found between the rotation-speed variation pattern and the predetermined pattern in above decision step.

In another preferred mode for carrying out the misfire detecting method mentioned above, the resonance state decision step may be comprised of the substeps of detecting operation state of the internal combustion engine to thereby output a signal containing information indicative of the operation state of the engine, and making decision on the basis of the information mentioned above as to whether or not the operation state of the internal combustion engine matches at least reasonably with a predetermined operation state in which resonance with the driving system can take place, wherein the misfire occurrence determining step is invalidated when matching is found between the aforementioned operation state and the predetermined operation state.

In yet another preferred mode for carrying out the misfire detecting method according to the general aspect of the invention described previously, the resonance state decision step may include the steps of deciding whether or not a rotation-speed variation pattern of the variation of the rotation speed of the engine matches at least reasonably with a predetermined pattern which indicates resonance with the driving system, detecting operation state of the internal combustion engine to thereby output a signal containing information indicative of the operation state of the engine, and making decision on the basis of the above-mentioned information as to whether or not the operation state of the internal combustion engine matches at least reasonably with a predetermined operation state in which resonance with the driving system can take place, wherein the misfire occurrence determining step is invalidated either when the operation state matches at least reasonably with the predetermined operation state or when the rotation-speed variation pattern matches at least reasonably with the predetermined pattern.

According to another general aspect of the present invention, there is provided a misfire detecting apparatus for an internal combustion engine, which apparatus includes a driving system operatively coupled to the engine for driving a load, a crank angle sensor mounted on a crank shaft of the internal combustion engine for generating a crank angle signal for every predetermined crank angle of the engine, a rotation-speed variation detecting means for detecting variation in rotation of the internal combustion engine on the basis of the crank angle signal, a misfire decision means for determining occurrence of misfire on the basis of the variation in the rotation speed of the engine, a resonance state decision means for deciding whether or not the internal combustion engine is in resonance operation state in which resonance with the driving system can occur, and a misfire decision inhibit means for invalidating the misfire decision means when decision is made by the resonance state decision means that the engine is in the resonance operation state.

In a preferred mode for implementing the apparatus described above, the aforementioned resonance state decision means may include a rotation-speed variation pattern decision means for deciding whether or not a rotation-speed variation pattern of the variation of the rotation speed of the engine matches at least reasonably with a predetermined pattern which indicates resonance with the driving system, wherein the misfire decision inhibit means invalidates the misfire decision means when matching is found between the rotation-speed variation pattern and the predetermined pattern.

In another preferred mode for carrying out the invention, the resonance state decision means mentioned above may be composed of at least one sensor means for detecting operation state of the internal combustion engine to thereby output a signal containing information indicative of the operation state of the engine, and an operation state decision means for making decision on the basis of the information as to whether or not the operation state of the internal combustion engine matches at least reasonably with a predetermined operation state in which resonance with the driving system can take place, wherein the misfire decision inhibit means invalidates the misfire decision means when matching is found between the operation state and the predetermined operation state.

In yet another preferred mode for carrying out the invention, the resonance state decision means mentioned above may be composed of a rotation-speed variation pattern decision means for deciding whether or not a rotation-speed variation pattern of the variation of the rotation speed of the engine matches at least reasonably with a predetermined pattern which indicates resonance with the driving system operatively coupled to the internal combustion engine, at least one sensor means for detecting operation state of the internal combustion engine to thereby output a signal containing information indicative of the operation state of the engine, and an operation state decision means for making decision on the basis of the information as to whether or not the operation state of the internal combustion engine matches at least reasonably with a predetermined operation state in which resonance with the driving system can take place, wherein the misfire decision inhibit means invalidates the misfire decision means either when the operation state matches at least reasonably with the predetermined operation state or when the rotation-speed variation pattern matches with the predetermined pattern.

More specifically, there is provided according to an aspect of the invention a misfire detecting apparatus for an internal combustion engine, which apparatus includes a crank angle sensor means mounted on a crank shaft of the internal combustion engine for generating a crank angle signal for every predetermined crank angle of the engine, a rotation-speed variation detecting means for detecting variation in rotation of the internal combustion engine on the basis of the crank angle signal, a misfire decision means for determining occurrence of misfire on the basis of the variation in the rotation speed of the engine, a rotation-speed variation pattern decision means for deciding whether or not a rotation-speed variation pattern of the variation of the rotation speed of the engine matches at least reasonably with a predetermined pattern which indicates resonance with a driving system operatively coupled to the internal combustion engine, and a misfire decision inhibit means for invalidating the misfire decision means when matching is found between the rotation-speed variation pattern and the predetermined pattern.

In a preferred embodiment of the misfire detecting apparatus described just above, the rotation-speed variation detecting means may be so implemented as to detect the variation in the rotation speed of the internal combustion engine on the basis of a pulse period of the crank angle signal. In that case, rotation-speed variation pattern decision means may be so implemented as to make decision concerning matching between the rotation-speed variation pattern and the predetermined pattern on the basis of a variation index indicating variation of the pulse period.

Further, the misfire detecting apparatus for an internal combustion engine may be comprised of a crank angle sensor means mounted on a crank shaft of the internal combustion engine for generating a crank angle signal for every predetermined crank angle of the engine, a rotation-speed variation detecting means for detecting variation in rotation of the internal combustion engine on the basis of the crank angle signal, a misfire decision means for determining occurrence of misfire on the basis of the variation in the rotation speed of the engine, at least one sensor for detecting operation state of the internal combustion engine to thereby output a signal containing information indicative of the operation state of the engine, an operation state decision means for making decision on the basis of the information as to whether or not the operation state of the internal combustion engine matches at least reasonably with a predetermined operation state in which resonance with a driving system operatively coupled to the internal combustion engine can take place, and a misfire decision inhibit means for invalidating the misfire decision means when matching is found between the operation state and the predetermined operation state.

In a preferred mode for carrying out the invention mentioned just above, the operation state information derived from the output of the sensor means may contain at least information concerning rotation speed of the internal combustion engine, a load of the engine and a transmission gear ratio of the driving system, wherein the operation state decision means may be so implemented as to determine operation state in which at least one of the rotation speed and the load is lower than a predetermined value inclusive thereof as the predetermined operation state. Alternatively, the operation state decision means may be so implemented as to determine operation state in which the transmission gear ratio is not smaller than a predetermined value as the predetermined operation state.

According to a further aspect of the present invention, there is provided a misfire detecting apparatus for an internal combustion engine, which apparatus includes a crank angle sensor means mounted on a crank shaft of the internal combustion engine for generating a crank angle signal for every predetermined crank angle of the engine, a rotation-speed variation detecting means for detecting variation in rotation of the internal combustion engine on the basis of the crank angle signal, a misfire decision means for determining occurrence of misfire on the basis of the variation in the rotation speed variation of the engine, a rotation-speed variation pattern decision means for deciding whether or not a rotation-speed variation pattern of the variation of the rotation speed of the engine matches at least reasonably with a predetermined pattern which indicates resonance with a driving system operatively coupled to the internal combustion engine, at least one sensor means for detecting operation state of the internal combustion engine to thereby output a signal containing information indicative of the operation state of the engine, an operation state decision means for making decision on the basis of the information as to whether or not the operation state of the internal combustion engine matches at least reasonably with a predetermined operation state in which resonance with a driving system operatively coupled to the internal combustion engine can take place, and a misfire decision inhibit means for invalidating the misfire decision means either when the operation state matches at least reasonably with the predetermined operation state or when the rotation-speed variation pattern matches at least reasonably with the predetermined pattern.

In the misfire detecting apparatus described above, the operation state information derived from the output of the sensor means may contain at least information concerning rotation speed of the internal combustion engine, a load of the engine and a transmission gear ratio of the driving system. In that case, the operation state decision means may be so designed as to determine operation state in which at least one of the rotation speed and the load is lower than a predetermined value inclusive thereof as the predetermined operation state. Alternatively, the operation state decision means may be so designed as to determine operation state in which the transmission gear ratio is not smaller than a predetermined value as the predetermined operation state.

Owing to the teachings of the present invention enumerated above, the erroneous misfire occurrence decision due to the resonance with the driving system coupled operatively to the internal combustion engine can positively prevented, whereby reliability of misfire decision can be improved significantly.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Now, the present invention will be described in detail in conjunction with what is presently considered as preferred or typical embodiments thereof by reference to the drawings. In the following description, like reference characters designate like or corresponding parts throughout the several views.

EMBODIMENT 1

Figure 1:
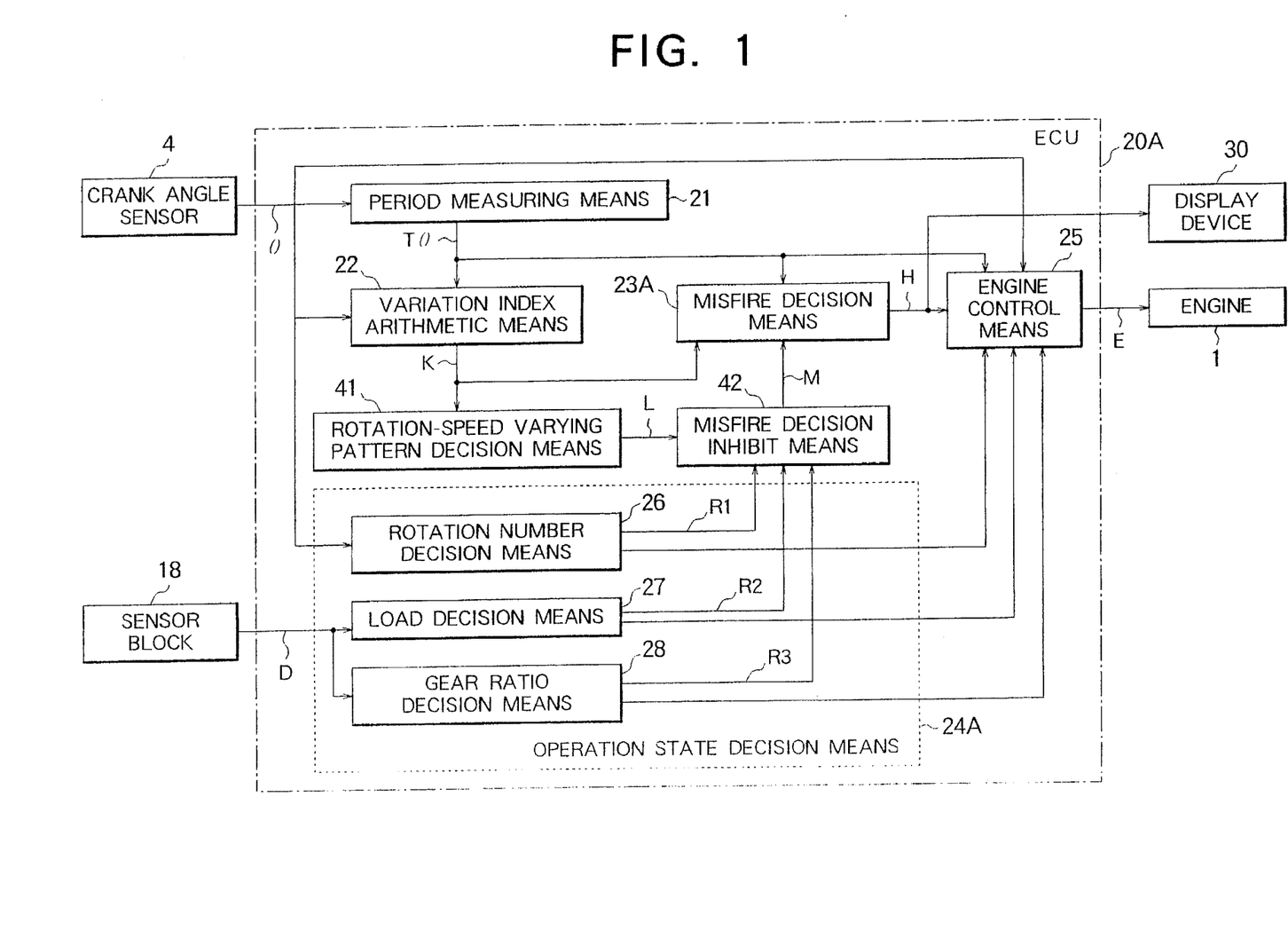
FIG. 1 is a functional block diagram showing generally an arrangement of a misfire detecting apparatus according to an embodiment of the present invention.

FIG. 1 is a functional block diagram showing generally an arrangement of a misfire detecting apparatus according to a first embodiment of the present invention. In the figure, similar or same components as those described hereinbefore by reference to FIG. 7 are denoted by like reference numbers, while components functionally corresponding to those shown in FIG. 7 are designated by like reference characters affixed with "A".

Further, the engine control system to which the misfire detecting apparatus according to the invention can be applied is substantially same as the system shown in FIG. 6. Additionally, basic operation of the misfire decision means 23 is same as described hereinbefore by reference to FIG. 8.

Referring to FIG. 1, according to the teachings incarnated in the instant embodiment, there is incorporated in the electronic control unit or ECU designated generally by reference character 20A an operation state decision means 24A which is comprised of a rotation number decision means 26 for determining a rotation speed or number (rpm) of the engine 1 on the basis of the crank angle signal θ, a load decision means 27 for determining the load applied to the internal combustion engine 1 and a gear ratio decision means 28 for determining a transmission gear ratio of a driving system operatively coupled to the engine 1 for driving a load or loads (not shown).

The rotation number decision means 26, the load decision means 27 and the gear ratio decision means 28 serve for implementing a function for deciding whether operation state of the engine 1 is in a predetermined operation state in which resonance with a driving system is brought about. When the engine 1 is in such predetermined operation state, the rotation number decision means 26, the load decision means 27 and the transmission gear ratio decision means 28 output resonance range decision signals R1 to R3, respectively.

As described previously, the rotation number decision means 26 may be so implemented as to serve for the function of the period measuring means 21 as well.

Further, the sensor block 18 may be provided with a shift pattern sensor for indicating a gear shift position of the driving system of the engine 1.

Further, in the case of the misfire detecting apparatus according to the instant embodiment of the invention, the ECU 20A includes additionally a rotation-speed variation pattern decision means 41 for determining a rotation-speed variation pattern on the basis of the variation index K mentioned hereinbefore and a misfire decision inhibit means 42 for invalidating or disabling operation of the misfire decision means 23A when the rotation-speed variation pattern determined on the basis of the variation index K matches at least reasonably (i.e., with an permissible tolerance) with a predetermined pattern indicating a resonance state in which resonance with the driving system may occur.

Parenthetically, such predetermined patterns concerning the resonance state are reported in various literatures publicly circulated before the invention was made and known heretofore. It is assumed that such predetermined pattern indicating the resonance state is stored in a read-only memory or ROM incorporated in the ECU 20A.

The rotation-speed variation pattern decision means 41 is so designed as to decide whether the rotation-speed variation pattern matches at least reasonably with the predetermined pattern indicating the resonance state with the driving system. When this decision results in affirmation, the misfire decision inhibit means 42 responds to a resonance decision signal L issued by the rotation-speed varying pattern decision means 41 to thereby output an inhibit signal M for invalidating or disabling the function of the misfire decision means 23A.

Furthermore, the misfire decision inhibit means 42 is so designed as to response to either one of the resonance range decision signals R1, R2 and R3 outputted from the operation state decision means 24A to thereby output the inhibit signal M in the case where the operation state matches at least reasonably with a predetermined operation state.

In this way, the misfire decision means 23A is invalidated by the misfire decision inhibit means 42 when the rotation-speed variation pattern coincides or matches at least reasonably with the predetermined pattern or when the operation state coincides with the predetermined operation state indicated by one of the resonance range decision signals R1 to R3.

Next, referring to a flow chart shown in FIG. 2, description will be made of processing operation for inhibiting the misfire decision based on the rotation-speed variation pattern in the misfire detecting apparatus shown in FIG. 1. At this juncture, it should first be mentioned that the timer counter and others incorporated in the ECU 20A are cleared or reset to zero upon starting of the engine 1.

Figure 2:
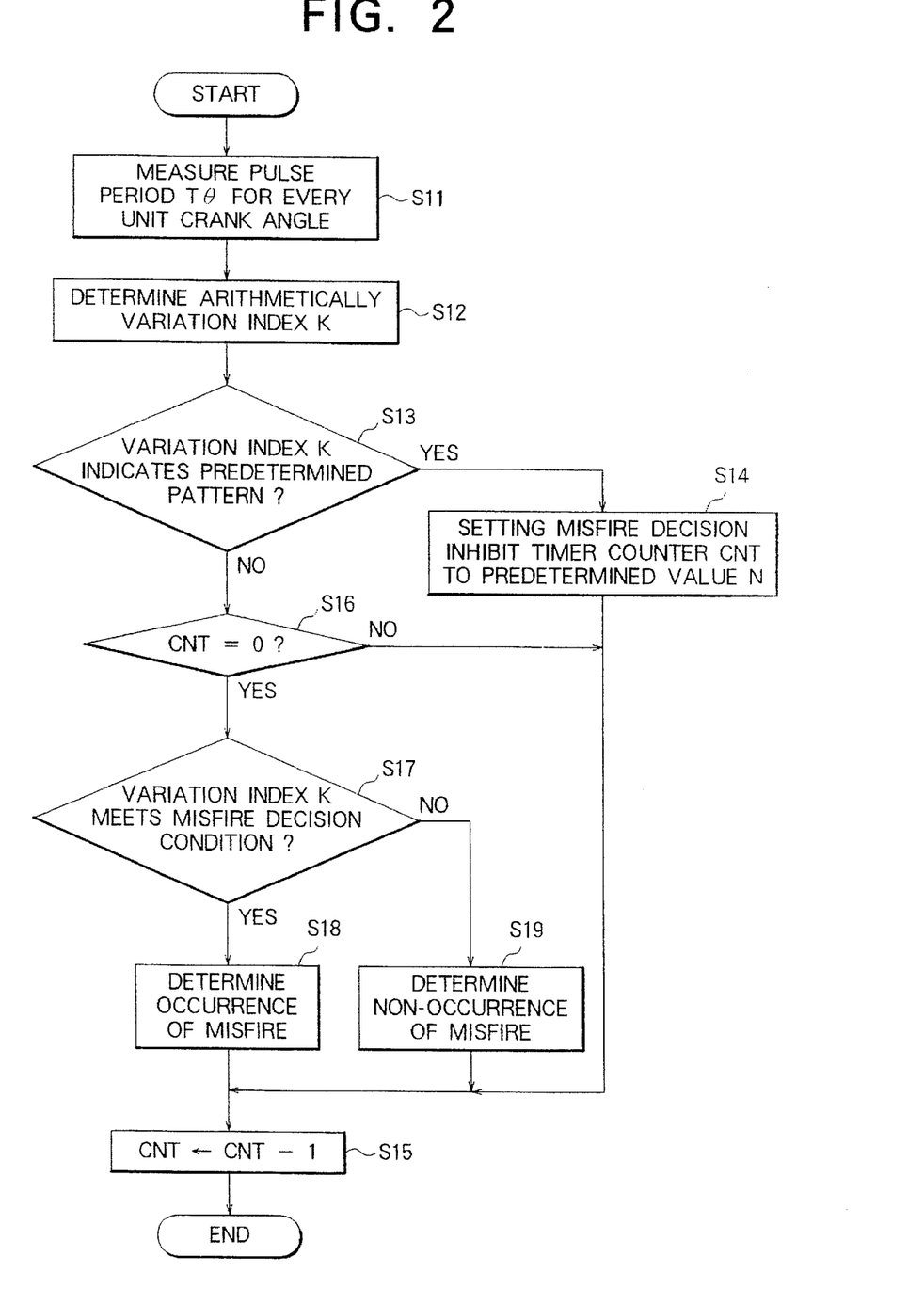
FIG. 2 is a flow chart for illustrating a processing operation for inhibiting a misfire decision based on a rotation-speed variation pattern according to a first embodiment of the invention.

As described previously, the period measuring means 21 determines or measures the pulse period or duration T0 for every unit crank angle in a step S11 shown in FIG. 2, while the variation index arithmetic means 22 arithmetically determines the variation index K defined previously on the basis of the pulse period or duration T8 in a step S12.

Subsequently, the rotation-speed variation pattern decision means 41 makes decision whether the variation index K indicates the predetermined pattern representing the resonance with the driving system in a step S13. When the decision step S13 results in affirmation "YES", the rotation-speed variation pattern decision means 41 outputs the resonance decision signal L. In response to the resonance decision signal L, the misfire decision inhibit means 42 outputs the inhibit signal M for inhibiting misfire decision performed by the misfire decision means 23A.

More specifically, when the decision step S13 results in affirmation "YES", a misfire decision inhibit timer counter CNT is set to a value N equivalent to a preset time period in a step S14, whereon the misfire decision inhibit timer counter CNT is decremented by one "1" in a step S15. Thereafter, the processing leaves the routine illustrated in FIG. 2.

In this manner, once the resonance decision signal L is generated, the inhibit signal M is outputted in continuation until the preset time has lapsed, even when the resonance decision signal L disappears upon restoration of the normal operation state of the engine 1.

On the other hand, when it is decided in the step S13 that the variation index K does not indicate the predetermined pattern (i.e., when the decision step S13 results in negation "NO"), it is decided whether the misfire decision inhibit timer counter CNT has been decremented down to zero (step S16). If the content of the misfire decision inhibit timer counter CNT is decided to be CNT>0, i.e., when the answer of the step S16 is negative "NO", then the decrement step S15 is executed for allowing the inhibit signal M to be outputted continuously, whereupon the processing leaves the routine shown in FIG. 2.

When the decision in the step S16 shows that CNT=0 (i.e., when the answer of the step S16 is "YES"), this means that the state in which resonance with the driving system does not take place has continued for a preset time. Accordingly, the inhibit signal M is cleared.

Thus, the misfire decision means 23A is now in the position to make ordinary misfire decision on the basis of the variation index K. In this conjunction, it should be noted that an ordinary misfire decision step S17 is executed immediately after starting of the engine operation unless the variation index K indicates the predetermined pattern, because the misfire decision inhibit timer counter CNT is reset to zero in the initial or starting state.

More specifically, in the ordinary misfire decision processing, it is first decided in the step S17 whether the variation index K meets the misfire decision condition mentioned previously. When this decision step S17 results in "YES", occurrence of misfire is determined, whereby the misfire decision signal H is outputted (step S18). If otherwise (i.e., if the answer of the step S17 is negative), non-occurrence of the misfire is determined, whereby the misfire decision signal H is prevented from being outputted (step S19).

In succession, the decrement step S15 is executed, whereupon the processing leaves the routine shown in FIG. 2, which provides no problem because the misfire decision inhibit timer counter CNT is clipped at zero even though the misfire decision inhibit timer counter CNT is decremented in succession.

By inhibiting the misfire decision when the rotation-speed variation pattern determined on the basis of the variation index K matches reasonably with or corresponds to the predetermined pattern indicating the resonance with the driving system, the erroneous misfire decision can be excluded in the normal operation state of the engine 1.

EMBODIMENT 2

Figure 3:
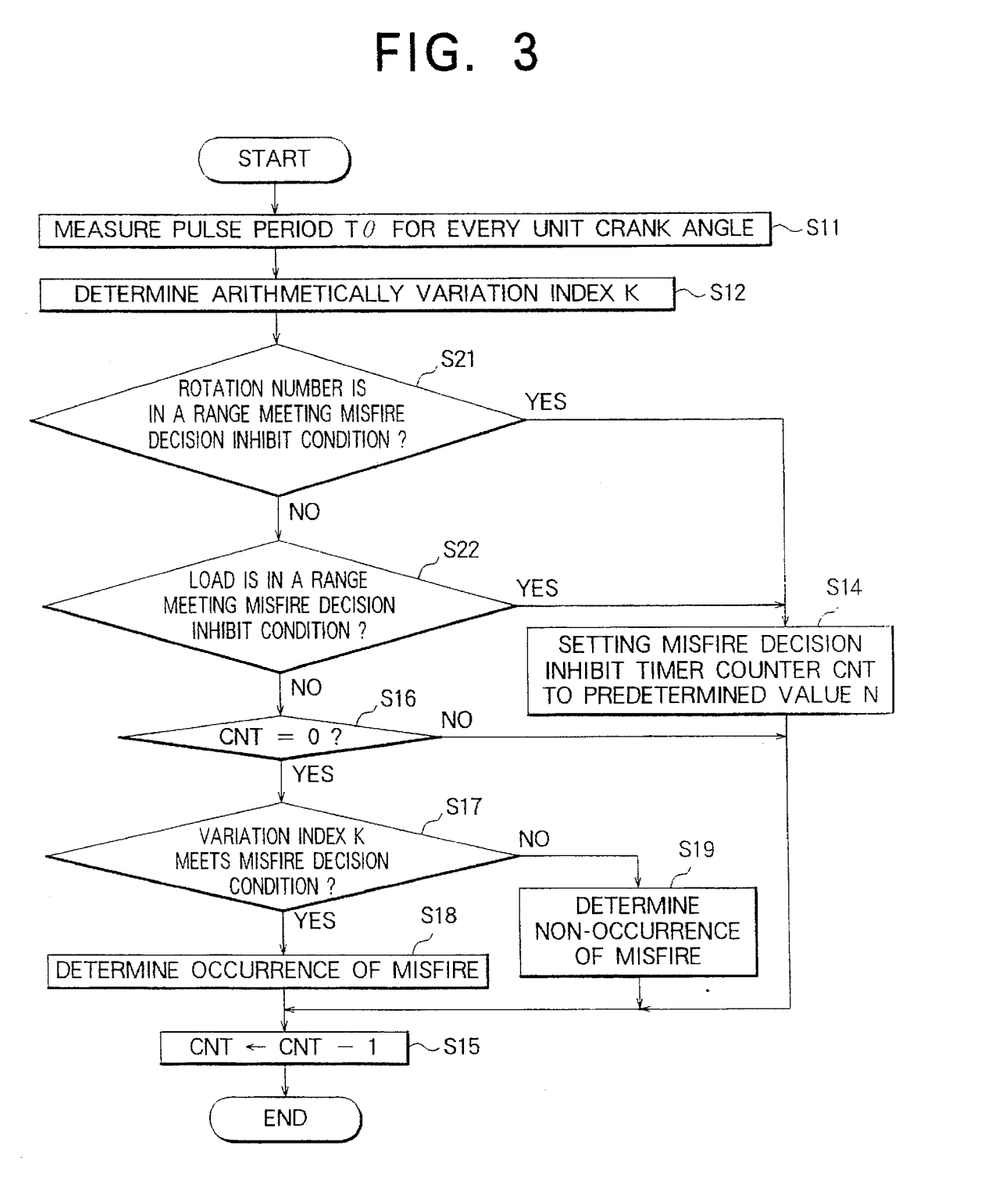
FIG. 3 is a flow chart for illustrating a misfire decision inhibit operation performed on the basis of engine rotation speed and engine load by the misfire detecting apparatus according to a second embodiment of the invention.

Next, referring to a flow chart shown in FIG. 3, description will be directed to the misfire decision inhibit procedure executed by the misfire detecting apparatus shown in FIG. 1 according to a second embodiment of the invention.

It should first be noted that the processing shown in FIG. 3 differs from that shown in FIG. 2 only in that steps S21 and S22 are provided instead of the pattern decision step S13. Except for this difference, the steps S11, S12 and S14 to S19 shown in FIG. 3 are same as those indicated by same reference characters in FIG. 2. Accordingly, repetitive elucidation of the same steps will be omitted in the following description.

At first, the pulse period or duration $T\theta$ and the variation index K are arithmetically determined in the steps S11 and S12, respectively, as described previously. Thereafter, it is decided by the rotation number decision means 26 on the basis of the crank angle signal $\theta$ whether or not the rotation number or rotation speed (rpm) of the engine 1 lies within a range in which the misfire decision inhibit condition (i.e., condition for occurrence of resonance with the driving system, to say in another way) is met, as indicated in the step S21 in FIG. 3.

When it is decided in the step S21 that the rotation number or rotation speed is in a range meeting the misfire decision inhibit condition (i.e., when the decision step S21 results in "YES"), the rotation number decision means 26 outputs the resonance range decision signal R1. In response to this resonance range decision signal R1, the misfire decision inhibit means 42 sets the misfire decision inhibit timer counter CNT to a predetermined value N in the step S14.

If otherwise (i.e., when the answer of the decision step S21 is negative "NO"), the resonance range decision signal R1 is not outputted from the rotation number decision means 26.

In succession, it is decided by the load decision means 27 on the basis of the operation information D whether or not the load imposed on the engine 1 lies within a range in which the misfire decision inhibit condition can be satisfied (step S22).

When the answer of this decision step S22 is "YES", the resonance range decision signal R2 is outputted by the load decision means 27. In response to the resonance range decision signal R2, the misfire decision inhibit means 42 executes the misfire decision inhibit step S14.

On the other hand, unless the load is in the range satisfying the misfire decision inhibit condition (i.e., when the answer of the step S22 is "NO"), the resonance range decision signal R2 is not outputted from the load decision means 27. The processing then proceeds to a decision step S16 for deciding whether the misfire decision inhibit timer counter CNT is reset to zero.

As is apparent from the above description, when the rotation number or rotation speed of the engine 1 falls within a range in which the misfire decision inhibit condition is satisfied (i.e., the range in which resonance with the driving system may occur), the misfire decision is inhibited, whereby the erroneous misfire decision in the normal operation state of the engine 1 can positively be prevented.

As mentioned previously, variation in the load coupled to the engine 1 through the driving system will bring about variation in the rotation speed of the engine 1 by way of the driving system when the engine operates at a low speed, which may bring about erroneous decision of occurrence of the misfire. However, by inhibiting the misfire decision through the procedure described above when the engine is operating at a low speed (rpm) or under low or light load, possibility of the erroneous misfire decision can positively be excluded.

EMBODIMENT 3

The procedures illustrated in FIGS. 2 and 3 are so designed as to inhibit the misfire decision (steps S14 and S15) when the variation index K determined on the basis of the pulse period or duration Tθ exhibits the predetermined pattern (step S13) or when the engine operation states (rotation speed or load of the engine) lies within the respective predetermined range. However, the misfire decision may be inhibited when either the operation state of the engine or the rotation-speed variation pattern satisfies the misfire decision inhibit condition, as is shown in a flow chart shown in FIG. 4. The third embodiment of the present invention is directed to the processing illustrated in FIG. 4.

Figure 4:
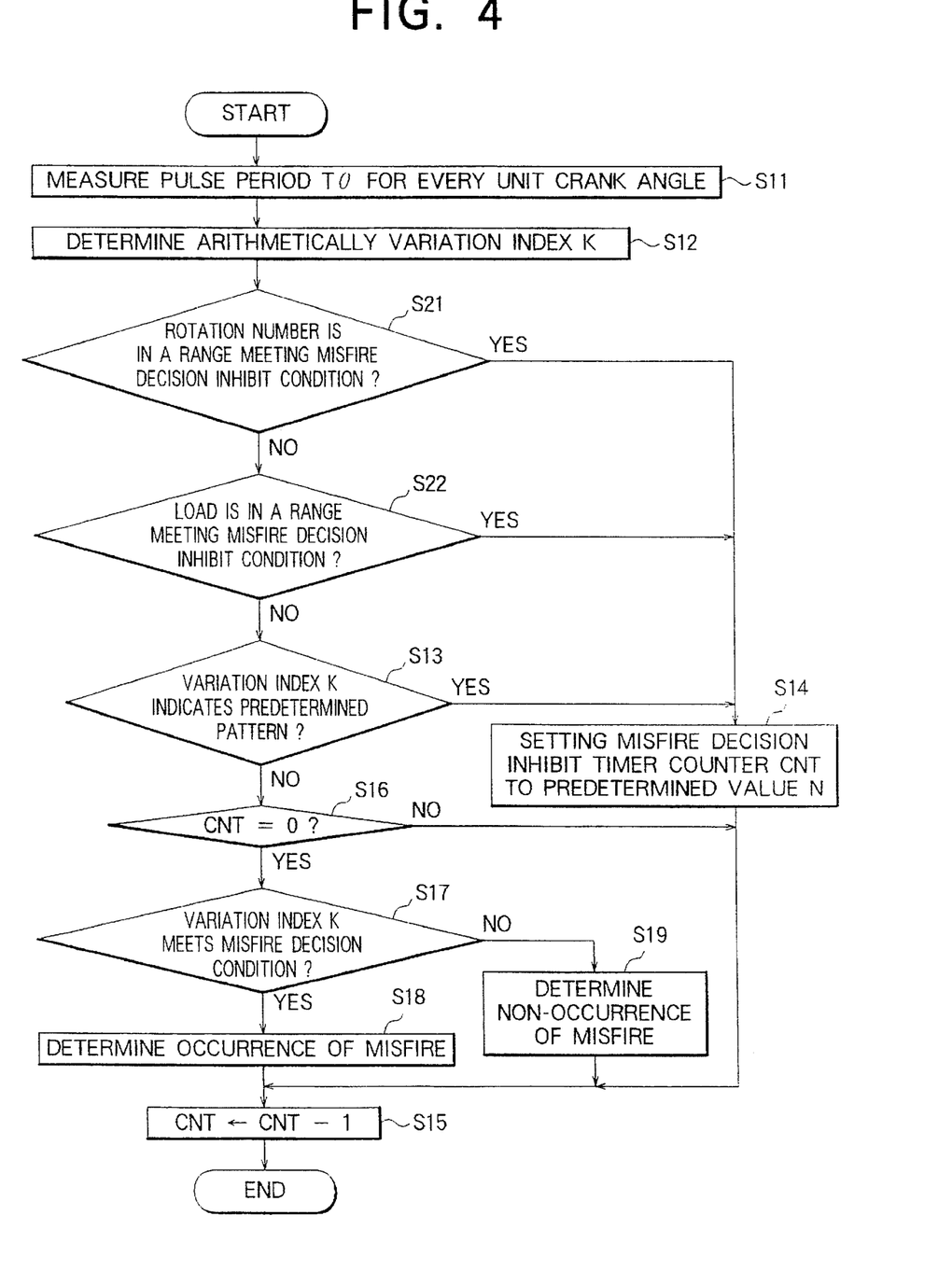
FIG. 4 is a flow chart for illustrating a misfire decision inhibit operation performed on the basis of the rotation-speed variation pattern, the engine rotation speed and/or the engine load by the misfire detecting apparatus according to a third embodiment of the invention.

Referring to FIG. 4, it is first to be noted that processing contents of the steps S11 to S19, S21 and S22 are same as those of the steps designated by like reference characters and described hereinbefore. Accordingly, repetitive description of these steps will be unnecessary.

Referring to FIG. 4, when the misfire decision inhibit condition is validated on the basis of the rotation number or rotation speed of the engine 1 in the step S21 or when the misfire decision inhibit condition based on the load of the engine 1 is validated in the step S22 or when the variation index K exhibits the predetermined pattern in the step S13, then the misfire decision inhibit timer counter CNT is set to a predetermined value N in the step S14.

EMBODIMENT 4

Next, referring to a flow chart shown in FIG. 5, description will be made of the misfire decision inhibit operation carried out by the misfire detecting apparatus shown in FIG. 1 in accordance with a fourth embodiment of the invention on the basis of the transmission gear ratio information.

Figure 5:
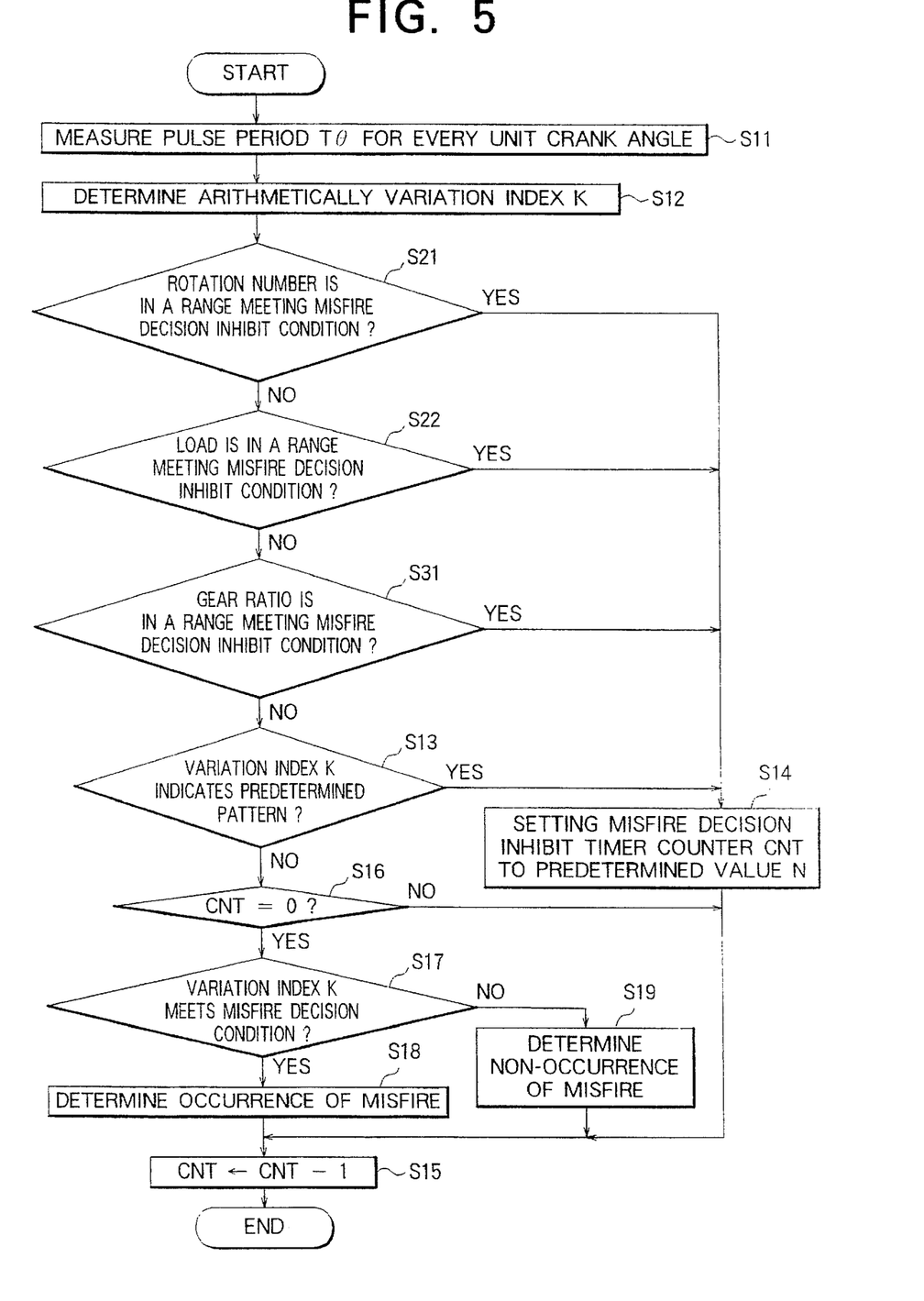
FIG. 5 is a flow chart for illustrating a misfire decision inhibit operation carried out by the misfire detecting apparatus on the basis of a transmission gear ratio solely or in addition to the engine speed and engine load state according to a fourth embodiment of the invention.

In this conjunction, it should however be noted that in the case of the procedure illustrated in FIG. 5, it is assumed that the misfire decision inhibit processings based on the rotation number or speed of the engine, the load and the pattern condition of the variation index K are also effected in addition to the misfire decision inhibit processing based on the transmission gear ratio. Thus, the procedure shown in FIG. 5 is essentially identical with that shown in FIG. 4 except that a transmission gear ratio-based misfire decision step S31 is added. Accordingly, the steps corresponding to the aforementioned steps S11 to S19, S21 and S22 are designated by using like reference characters and detailed description thereof is omitted.

Referring to FIG. 5, when it is decided in the engine operation state decision steps S21 and S22 that the respective misfire decision inhibit conditions are not satisfied (i.e., "NO"), then a step S31 is executed. Namely, it is decided by the transmission gear ratio decision means 28 on the basis of the operation information D such as the gear shift pattern or the like whether or not the transmission gear ratio as detected satisfies the misfire decision inhibit condition (i.e., the range of gear ratios within which resonance with the driving system may occur), as indicated in the step S31.

When the transmission gear ratio assumes a low value to satisfy the misfire decision inhibit condition (i.e., when the decision step S31 results in "YES"), the resonance range decision signal R3 is outputted by the transmission gear ratio decision means 28. In response to the resonance range decision signal R3, the misfire decision inhibit means 42 executes the decision inhibit step S14.

On the contrary, unless the detected transmission gear ratio meets the misfire decision inhibit condition (i.e., when the answer of the decision step S31 is "NO"), the transmission gear ratio decision means 28 does not output the resonance range decision signal R3. The processing then proceeds to the rotation-speed variation pattern decision step S13 described hereinbefore.

In this manner, when the misfire decision inhibit condition based on the transmission gear ratio range (i.e., the range within which resonance with the driving system may occur) is met in addition to satisfaction of the misfire decision inhibit conditions based on the rotation-speed variation pattern, engine rotation number or speed or the load of the engine, the misfire decision is inhibited. Thus, the erroneous misfire decision in the normal operation state of the engine can be prevented with significantly improved reliability.

As can be seen from the above description, with the procedure shown in FIG. 5 possibility of erroneous decision for the occurrence of the misfire can be remarkably suppressed by inhibiting the misfire decision when any one of all the misfire decision conditions is satisfied.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, in the misfire detecting apparatus described above, the misfire decision inhibit conditions are set on the basis of the pattern indicated by the variation index K and the various operating states of the engine, the misfire decision inhibit range may be set up in accordance with only one of the factors mentioned above. Furthermore, it is contemplated that storage or recording media on which the teachings of the invention are recorded in the form of programs executable by computers inclusive of microprocessor are to be covered by the invention.

Accordingly, all suitable modifications and equivalents may be resorted to, falling within the spirit and scope of the invention.

What is claimed is:

1. A method of detecting occurrence of misfire in an internal combustion engine to which a driving system for driving a load is operatively connected, comprising the steps of:

a) generating a crank angle signal for every predetermined crank angle of said engine;

b) detecting variation in rotation speed of said internal combustion engine on the basis of information given by said crank angle signal;

c) determining occurrence of misfire on the basis of the variation in said rotation speed of said engine;

d) deciding whether or not said internal combustion engine is in resonance operation state in which resonance with said driving system can occur; and e) invalidating said misfire occurrence determining step c) when decision that said engine is in said resonance operation state is made in said resonance state decision step d).

2. A misfire detecting method according to claim 1, said resonance state decision step d) including the substep of:

f) deciding whether or not a rotation-speed variation pattern of the variation of said rotation speed of said engine matches at least reasonably with a predetermined pattern which indicates resonance with said driving system, wherein said misfire occurrence determining step c) is invalidated when matching is found between said rotation-speed variation pattern and said predetermined pattern in said step f).

3. A misfire detecting method according to claim 1, said resonance state decision step including the substeps of:

g) detecting operation state of said internal combustion engine to thereby output a signal containing information indicative of said operation state of said engine; and h) making decision on the basis of said information as to whether or not said operation state of said internal combustion engine matches at least reasonably with a predetermined operation state in which resonance with said driving system can take place, wherein said misfire occurrence determining step c) is invalidated when matching is found between said operation state and said predetermined operation state.

4. A misfire detecting method according to claim 1, said resonance state decision step f) including the steps of:

i) deciding whether or not a rotation-speed variation pattern of the variation of said rotation speed of said engine matches at least reasonably with a predetermined pattern which indicates resonance with said driving system;

j) detecting operation state of said internal combustion engine to thereby output a signal containing information indicative of said operation state of said engine; and k) making decision on the basis of said information as to whether or not said operation state of said internal combustion engine matches at least reasonably with a predetermined operation state in which resonance with the driving system can take place, wherein said misfire occurrence determining step c) is invalidated either when said operation state matches at least reasonably with said predetermined operation state or when said rotation-speed variation pattern matches at least reasonably with said predetermined pattern.

5. A misfire detecting apparatus for an internal combustion engine, comprising:

a driving system operatively coupled to said engine for driving a load;

crank angle sensor means mounted on a crank shaft of said internal combustion engine for generating a crank angle signal for every predetermined crank angle of said engine;

rotation-speed variation detecting means for detecting variation in rotation of said internal combustion engine on the basis of said crank angle signal;

misfire decision means for determining occurrence of misfire on the basis of the variation in said rotation speed of said engine;

resonance state decision means for deciding whether or not said internal combustion engine is in resonance operation state in which resonance with said driving system can occur; and misfire decision inhibit means for invalidating said misfire decision means when decision is made by said resonance state decision means that said engine is in said resonance operation state.

6. A misfire detecting apparatus according to claim 5, said resonance state decision means including:

rotation-speed variation pattern decision means for deciding whether or not a rotation-speed variation pattern of the variation of said rotation speed of said engine matches at least reasonably with a predetermined pattern which indicates resonance with said driving system operatively coupled to said internal combustion engine, wherein said misfire decision inhibit means invalidates said misfire decision means when matching is found between said rotation-speed variation pattern and said predetermined pattern.

7. A misfire detecting apparatus according to claim 5, said resonance state decision means including:

at least one sensor means for detecting operation state of said internal combustion engine to thereby output a signal containing information indicative of said operation state of said engine; and operation state decision means for making decision on the basis of said information as to whether or not said operation state of said internal combustion engine matches at least reasonably with a predetermined operation state in which resonance with the driving system can take place, wherein said misfire decision inhibit means invalidates said misfire decision means when matching is found between said operation state and said predetermined operation state.

8. A misfire detecting apparatus according to claim 5, said resonance state decision means including:

rotation-speed variation pattern decision means for deciding whether or not a rotation-speed variation pattern of the variation of said rotation speed of said engine matches at least reasonably with a predetermined pattern which indicates resonance with the driving system operatively coupled to said internal combustion engine;

at least one sensor means for detecting operation state of said internal combustion engine to thereby output a signal containing information indicative of said operation state of said engine; and operation state decision means for making decision on the basis of said information as to whether or not said operation state of said internal combustion engine matches at least reasonably with a predetermined operation state in which resonance with the driving system can take place, wherein said misfire decision inhibit means invalidates said misfire decision means either when said operation state matches at least reasonably with said predetermined operation state or when said rotation-speed variation pattern matches at least reasonably with said predetermined pattern.

9. A misfire detecting apparatus for an internal combustion engine, comprising:

crank angle sensor means mounted on a crank shaft of said internal combustion engine for generating a crank angle signal for every predetermined crank angle of said engine;

rotation-speed variation detecting means for detecting variation in rotation of said internal combustion engine on the basis of said crank angle signal;

misfire decision means for determining occurrence of misfire on the basis of the variation in said rotation speed of said engine;

rotation-speed variation pattern decision means for deciding whether or not a rotation-speed variation pattern of the variation of said rotation speed of said engine matches at least reasonably with a predetermined pattern which indicates resonance with a driving system operatively coupled to said internal combustion engine; and misfire decision inhibit means for invalidating said misfire decision means when matching is found between said rotation-speed variation pattern and said predetermined pattern.

10. A misfire detecting apparatus according to claim 9, wherein said rotation-speed variation detecting means detects the variation in the rotation speed of said internal combustion engine on the basis of a period of said crank angle signal, and wherein rotation-speed variation pattern decision means make decision as to matching of said rotation-speed variation pattern with said predetermined pattern on the basis of a variation index indicating variation of said period.

11. A misfire detecting apparatus for an internal combustion engine, comprising:

crank angle sensor means mounted on a crank shaft of said internal combustion engine for generating a crank angle signal for every predetermined crank angle of said engine;

rotation-speed variation detecting means for detecting variation in rotation of said internal combustion engine on the basis of said crank angle signal;

misfire decision means for determining occurrence of misfire on the basis of the variation in said rotation speed of said engine;

at least one sensor means for detecting operation state of said internal combustion engine to thereby output a signal containing information indicative of said operation state of said engine can take place;

operation state decision means for making decision on the basis of said information as to whether or not said operation state of said internal combustion engine matches at least reasonably with a predetermined operation state in which resonance with a driving system operatively coupled to said internal combustion engine; and misfire decision inhibit means for invalidating said misfire decision means when matching is found between said operation state and said predetermined operation state.

12. A misfire detecting apparatus according to claim 11, said operation state information derived from the output of said sensor means containing at least information concerning rotation speed of said internal combustion engine, a load of said engine and a transmission gear ratio of said driving system, wherein said operation state decision means determines operation state in which at least one of said rotation speed and said load is lower than a predetermined value inclusive thereof as said predetermined operation state.

13. A misfire detecting apparatus according to claim 12, said operation state information derived from the output of said sensor means containing at least information concerning rotation speed of said internal combustion engine, a load of said engine and a transmission gear ratio of said driving system, wherein said operation state decision means determines operation state in which said transmission gear ratio is not smaller than a predetermined value as said predetermined operation state.

14. A misfire detecting apparatus for an internal combustion engine, comprising:

crank angle sensor means mounted on a crank shaft of said internal combustion engine for generating a crank angle signal for every predetermined crank angle of said engine;

rotation-speed variation detecting means for detecting variation in rotation of said internal combustion engine on the basis of said crank angle signal;

misfire decision means for determining occurrence of misfire on the basis of the variation in said rotation speed variation of said engine;

rotation-speed variation pattern decision means for deciding whether or not a rotation-speed variation pattern of the variation of said rotation speed of said engine matches at least reasonably with a predetermined pattern which indicates resonance with a driving system operatively coupled to said internal combustion engine;

at least one sensor means for detecting operation state of said internal combustion engine to thereby output a signal containing information indicative of said operation state of said engine;

operation state decision means for making decision on the basis of said information as to whether or not said operation state of said internal combustion engine matches at least reasonably with a predetermined operation state in which resonance with a driving system operatively coupled to said internal combustion engine can take place; and misfire decision inhibit means for invalidating said misfire decision means either when said operation state matches at least reasonably with said predetermined operation state or when said rotation-speed variation pattern matches at least reasonably with said predetermined pattern.

15. A misfire detecting apparatus according to claim 14, said operation state information derived from the output of said sensor means containing at least information concerning rotation speed of said internal combustion engine, a load of said engine and a transmission gear ratio of said driving system, wherein said operation state decision means determines operation state in which at least one of said rotation speed and said load is lower than a predetermined value inclusive thereof as said predetermined operation state.

16. A misfire detecting apparatus according to claim 14, said operation state information derived from the output of said sensor means containing at least information concerning rotation speed of said internal combustion engine, a load of said engine and a transmission gear ratio of said driving system, wherein said operation state decision means determines operation state in which said transmission gear ratio is not smaller than a predetermined value as said predetermined operation state.

* * * * *